(12) United States Patent
Li

(10) Patent No.: US 11,887,111 B2
(45) Date of Patent: Jan. 30, 2024

(54) ELECTRONIC CURRENCY OFFLINE PAYMENT METHOD AND PAYMENT COLLECTION METHOD

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 150 days.

(21) Appl. No.: 17/454,067

(22) Filed: Nov. 9, 2021

(65) Prior Publication Data

US 2022/0067720 A1 Mar. 3, 2022

Related U.S. Application Data

(63) Continuation of application No. PCT/CN2020/080772, filed on Mar. 24, 2020.

(30) Foreign Application Priority Data

May 9, 2019 (CN) .......................... 201910383677.0
May 9, 2019 (CN) .......................... 201910384112.4

(51) Int. Cl.
*G06Q 20/38* (2012.01)
*G06Q 20/40* (2012.01)

(52) U.S. Cl.
CPC ....... *G06Q 20/3821* (2013.01); *G06Q 20/401* (2013.01)

(58) Field of Classification Search
CPC .................. G06Q 20/3821; G06Q 20/401
See application file for complete search history.

(56) References Cited

U.S. PATENT DOCUMENTS 10,049,349 B1  8/2018  Grassadonia et al.
2008/0183622 A1* 7/2008  Dixon ................ G06Q 20/0855
                                                      705/44
(Continued)

FOREIGN PATENT DOCUMENTS

CN   103077456   5/2013
CN   104850984   8/2015
(Continued)

OTHER PUBLICATIONS

"Merchant Processing During Communications Disruptions," EMV Migration Forum, dated Apr. 2016 https://www.emv-connection.com/downloads/2016/04/Merchant-Processing-during-Communication-Disruption-FINAL-April-2016.pdf (Year: 2016).*
(Continued)

*Primary Examiner* — Gregory S Cunningham, II
*Assistant Examiner* — Raven E Yono
(74) *Attorney, Agent, or Firm* — Grossman, Tucker, Perreault & Pfleger, PLLC

(57) ABSTRACT

Offline electronic currency payment and collection methods are provided. The payment method includes: establishing, by a first device, a wireless connection with a peer device, acquiring wallet information, and transmitting the wallet information to a first peer device without deleting stored electronic currency; and receiving collection information, verifying that first peer offline account information is not included in an offline transaction blacklist, acquiring first transaction information, digitally signing the first transaction information, transmitting first transaction data including signature data to the first peer device, and storing a first transaction record.

15 Claims, 2 Drawing Sheets

(56) References Cited

U.S. PATENT DOCUMENTS

| | | | | |
|---|---|---|---|---|
| 2013/0226797 A1* | 8/2013 | Jiang | ................... | G06Q 20/3552 |
| | | | | 705/44 |
| 2014/0372300 A1* | 12/2014 | Blythe | ................ | G06Q 20/3676 |
| | | | | 705/41 |
| 2015/0170112 A1* | 6/2015 | DeCastro | ............. | G06Q 20/381 |
| | | | | 705/39 |
| 2018/0240107 A1* | 8/2018 | Andrade | ............... | G06Q 20/065 |

FOREIGN PATENT DOCUMENTS

| | | |
|---|---|---|
| CN | 106033571 | 10/2016 |
| CN | 106056419 | 10/2016 |
| WO | 2016061093 A1 | 4/2016 |

OTHER PUBLICATIONS

"3 things to know about offline credit card processing," Heartland, dated Jan. 3, 2015 https://www.heartland.us/resources/blog/3-things-to-know-about-offline-credit-card-processing (Year: 2016).*

Bindisha Sarang, "Five things to know about contactless credit and debit cards," The Economic Times, dated Jan. 19, 2015 https://economictimes.indiatimes.com/wealth/spend/five-things-to-know-about-contactless-credit-and-debit-cards/articleshow/45921377.cms?from=mdr (Year: 2015).*

English translation of International Search Report from corresponding PCT Appln. No. PCT/CN2020/080772 dated Jun. 29, 2020.

English translation of Written Opinion from corresponding PCT Appln. No. PCT/CN2020/080772 dated Jun. 29, 2020.

Extended European Search Report from related Application No. 20802238.4 dated Oct. 17, 2022. 11 pages.

* cited by examiner

ELECTRONIC CURRENCY OFFLINE PAYMENT METHOD AND PAYMENT COLLECTION METHOD

CROSS-REFERENCE TO RELATED APPLICATIONS

This application is a continuation of International Application No. PCT/CN2020/080772, filed on Mar. 24, 2020, which claims priority to Chinese patent application No. 201910384112.4, entitled "Method and Apparatus for Offline Electronic Currency Payment", filed on May 9, 2019, and Chinese patent application No. 201910383677.0, entitled "Method and Apparatus for Offline Electronic Currency Collection", filed on May 9, 2019, the entire contents of which are incorporated herein by reference.

FIELD

The present disclosure relates to the technical field of electronic currency transactions, in particular to an offline electronic currency payment method and an offline electronic currency collection method.

BACKGROUND

With the development of the Internet, electronic transactions have become more and more popular. There are various forms of electronic transactions such as bank transfer, WeChat Pay, Alipay, etc. However, the above payments require both parties or one party to be online. For account transfer, it is needed to connect to the bank background server to complete the transaction.

However, with the development of electronic money, the above-mentioned electronic transactions cannot be applied to collection and payment of electronic currency. Thus, how to provide an offline electronic currency collection and payment method is a technical problem to be urgently solved.

SUMMARY

The present disclosure aims to solve one of the problems set forth above.

A main purpose of the present disclosure is to provide an offline electronic currency payment method.

Another object of the present disclosure is to provide an offline electronic currency collection method.

In order to achieve the above objects, the technical solutions of the present disclosure are specifically achieved as follows.

The present disclosure provides an offline electronic currency payment method, which includes: controlling, by a first security control module, a first communication module to establish a wireless connection with a first peer device; acquiring, by the first security control module, wallet information from a first file storage module, and controlling, by the first security control module, the first communication module to transmit the wallet information to the first peer device, wherein the wallet information comprises offline account information, an available balance and an electronic currency; the electronic currency comprises at least the following fields: a currency denomination, an owner identification, and an issuer signature; and the first security control module does not delete the electronic currency stored in the first file storage module after transmitting the wallet information to the first peer device;

receiving, by the first security control module through the first communication module, collection information transmitted by the first peer device, wherein the collection information is generated and transmitted after passing a verification of the first peer device; passing the verification of the first peer device comprises: the first peer device verifying that the offline account information is not included in an offline transaction blacklist stored in the first peer device, verifying that the electronic currency is legal, and verifying that the available balance is smaller than or equal to a total denomination of the electronic currency, wherein the collection information at least comprises first peer offline account information;

verifying, by the first security control module, whether the first peer offline account information is included in an offline transaction blacklist stored in the first file storage module; in response to verifying that the first peer offline account information is not included in the offline transaction blacklist stored in the first file storage module, acquiring, by the first security control module, first transaction information; digitally signing, by the first security control module, the first transaction information; and transmitting, by the first security control module, first transaction data to the first peer device through the first communication module, wherein the first transaction information at least comprises the offline account information, the first peer offline account information, first transaction time and a first transaction amount, and the first transaction data at least comprises the first transaction information and first signature information obtained by digitally signing the first transaction information; and controlling, by the first security control module, the first file storage module to store a first transaction record comprising the first transaction data, and controlling, by the first security control module, the first file storage module to modify a stored current available balance into a balance obtained by deducting the first transaction amount from the available balance.

Another aspect of the present disclosure provides an offline electronic currency collection method including: controlling, by a second security control module, a second communication module to establish a wireless connection with a first device;

receiving, by the second security control module, wallet information through the second communication module, wherein the wallet information comprises first device offline account information, a first device available balance and a first device electronic currency, wherein the first device electronic currency at least comprises the following fields: a currency denomination, an owner identification, and an issuer signature;

performing a verification operation and passing of the verification by the second security control module, wherein the verification operation comprises: verifying whether the first device offline account information is included in an offline transaction blacklist stored in a second file storage module, verifying whether the first device electronic currency is legal, and verifying whether the first device available balance is smaller than or equal to a total denomination of the first device electronic currency; and the passing of the verification comprises: verifying that the first device offline account information is not included in the offline transaction blacklist stored in the second file storage module, verifying that the first device electronic currency is legal, and verifying that the first device available balance is smaller than or equal to the total denomination of the first device electronic currency;

transmitting, by the second security control module after the passing of the verification, collection information to the first device, wherein the collection information at least comprises self offline account information acquired from the second file storage module;

receiving, by the second security control module, first transaction data through the second communication module, wherein the first transaction data is generated after the first device verifies that the self offline account information is not included in an offline transaction blacklist stored in the first device; the first transaction data at least comprises first transaction information and first signature information obtained by digitally signing the first transaction information; and the first transaction information at least comprises the first device offline account information, the self offline account information, first transaction time and a first transaction amount; and verifying, by the second security control module, the first signature information in accordance with the first transaction information and a public key of the first device; controlling, by the second security control module in response to passing of the verifying, the second file storage module to set a current in-transit balance to a first balance, and controlling the storage module to store a first transaction record comprising the first transaction data, wherein the first balance is a balance obtained by adding the first transaction amount to an original in-transit balance.

Another aspect of the present disclosure provides a computer-readable storage medium, including computer instructions that, when executed on a processor, perform the offline electronic currency payment method described above.

Another aspect of the present disclosure provides a computer-readable storage medium, including computer instructions that, when executed on a processor, perform the offline electronic currency collection method described above.

According to the technical solution provided by the present disclosure, the offline electronic currency payment and collection methods provided by the present disclosure can achieve the offline transaction mode of the electronic currency, in which the offline transaction of the electronic currency can be completed as long as a user uses his/her hardware wallet to execute the touch and pay operation. Therefore, the security of an offline transaction of electronic currency is ensured, while facilitating the operation of the user.

DETAILED DESCRIPTION

Embodiments of the present disclosure will now be described in further detail with reference to the accompanying drawings.

Embodiment 1

Figure 1:
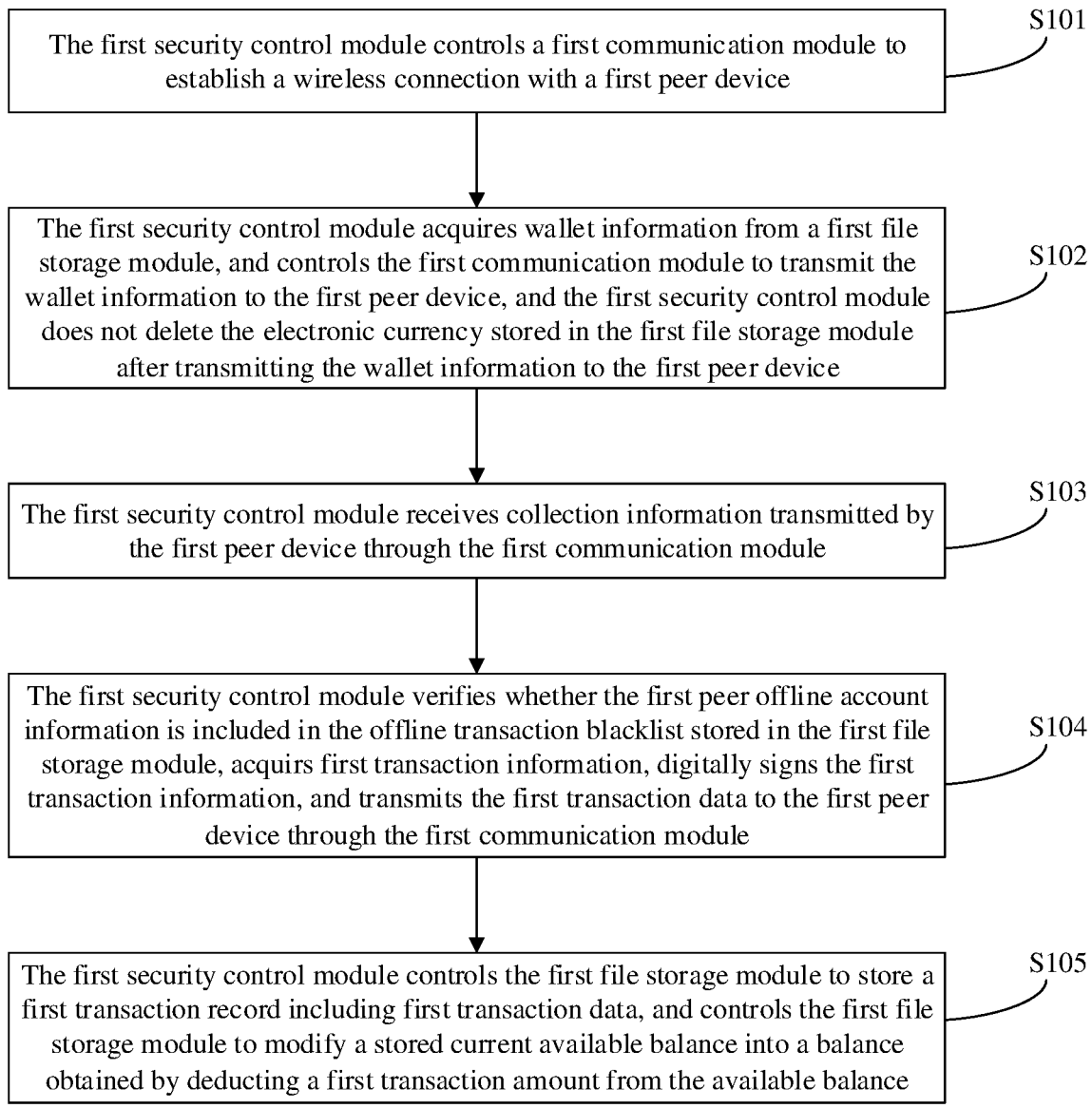
FIG. 1 is a flow chart of an offline electronic currency payment method provided in Embodiment 1 of the present disclosure.

FIG. 1 shows a flow chart of an offline electronic currency payment method provided by an embodiment of the present disclosure. Referring to FIG. 1, the offline electronic currency payment method provided by the embodiment of the present disclosure includes the following steps.

At S101, a first security control module controls a communication module to establish a wireless connection with a first peer device.

In particular, in the embodiment of the present disclosure, the subject for executing the offline electronic currency payment method provided by the embodiment of the present disclosure is a payer device. Of course, the subject can also serve as a payee device.

According to the embodiment of the present disclosure, the subject for executing the offline electronic currency payment method provided by the embodiment of the present disclosure (hereinafter referred to as an offline electronic currency payment apparatus) can be various consumption terminals such as a hardware wallet, a smart phone and the like. The hardware wallet can be a carrier of a legal digital currency (electronic currency) and a payment tool relying on a digital currency circulation system, can store a digital currency value code and user identity authentication information, and is a hardware product with a uniquely identifiable number, including, but not limited to, a card wallet, a shaped wallet, a SIM card, a bracelet, and the like.

The offline electronic currency payment apparatus provided by the embodiment of the present disclosure can establish a wireless connection with the first peer device for electronic currency payment. The electronic currency payment through the wireless connection can facilitate the user, so that the user can perform a remote operation in the payment, thereby improving the user experience. Of course, in practical application, the offline electronic currency payment apparatus can also establish a wired connection with the first peer device, and the embodiment of the present disclosure is explained only by taking the example that the offline electronic currency payment apparatus establishes the wireless connection with the first peer device.

The wireless connection established between the offline electronic currency payment apparatus and the first peer device provided by the embodiment of the present disclosure can be NFC connection, Bluetooth connection, WIFI, infrared and the like, and is not particularly limited in the present disclosure. As an alternative implementation of the embodiment of the present disclosure, the first security control module controlling the first communication module to establish the wireless connection with the first peer device includes: the first security control module controlling the communication module to establish an NFC connection with the first peer device; the first security control module controlling the communication module to transmit Bluetooth pairing information via the NFC connection; and the first security control module controlling the communication module to establish a Bluetooth connection with the first peer device by using the Bluetooth pairing information. In the application, a user can make the offline electronic currency payment apparatus and the first peer device get in touch with each other, that is to allow the Bluetooth pairing information to be transmitted via the NFC connection, and then the offline electronic currency payment apparatus can be separated from the first peer device. This solves the problem that the user can only make a payment at a short distance by using the offline electronic currency payment apparatus and the first peer device, and thus improves the user experience. The Bluetooth pairing information is transmitted via the NFC connection, so that a device to be connected can be quickly found, thereby improving the speed of Bluetooth connection. This avoids Bluetooth broadcasting of respective information and searching of a peer end for pairing in the traditional Bluetooth connection, which would otherwise cause the slow speed, and further avoids the problem that a device to be connected is connected to other Bluetooth devices instead of the current device.

In order to ensure transaction security between the offline electronic currency payment apparatus and the first peer device, as an alternative implementation of the embodiment of the present disclosure, the offline electronic currency payment method provided by an embodiment of the present disclosure further includes, subsequent to the first security control module controlling the communication module to establish the Bluetooth connection with the first peer device by using the Bluetooth pairing information, and prior to the first security control module controlling the communication module to transmit the wallet information to the first peer device: the first security control module performing mutual authentication with the first peer device through the Bluetooth connection. The authentication may include, but is not limited to, verifying a certificate of a peer end, verifying an identification of the peer end, and the like. Such verification may employ the existing verification methods, which will not be described in detail herein.

At S102, the first security control module acquires wallet information from a first file storage module, and controls the first communication module to transmit the wallet information to the first peer device. The wallet information includes offline account information, an available balance and an electronic currency. The electronic currency at least includes the following fields: a currency denomination, an owner identification, and an issuer signature. The first security control module does not delete the electronic currency stored in the first file storage module after transmitting the wallet information to the first peer device.

Specifically, the offline payment by the offline electronic currency payment apparatus means that the offline electronic currency payment apparatus is used independently without being connected to the back end.

The wallet information refers to relevant information stored by the offline electronic currency payment apparatus itself, which can be stored in a first file storage module and can include, but is not limited to, an electronic currency, offline account information of a user of the offline electronic currency payment apparatus, an available balance of the offline electronic currency payment apparatus and the like. As a further option for practical applications, the wallet information can also include user information of the user of the offline electronic currency payment apparatus, a digital certificate of the offline electronic currency payment apparatus, a secret key, transaction information and the like.

As an alternative implementation of the embodiment of the present disclosure, the electronic currency may include an electronic currency exchanged by the user of the offline electronic currency payment apparatus from an issuer (i.e., offline electronic currency). Alternatively, the electronic currency may include an electronic currency exchanged by the user of the offline electronic currency payment apparatus from the issuer (i.e., the offline electronic currency) and an electronic currency paid by others to the offline electronic currency payment apparatus (i.e., in-transit electronic currency).

As an alternative implementation of the embodiment of the present disclosure, the available balance may include an offline balance, and the electronic currency includes offline electronic currency. The offline balance is equal to a denomination of the electronic currency exchanged by the user of the offline electronic currency payment apparatus from the issuer. For example, after the electronic currency is exchanged by the user of the offline electronic currency payment apparatus from the People's Bank of China, the offline balance is set to the denomination of the electronic currency, and the offline balance can also be smaller than the denomination of the electronic currency exchanged by the user of the offline electronic currency payment apparatus from the issuer. For example, the user of the offline electronic currency payment apparatus paid one or more transactions after exchanging the electronic currency from the People's Bank of China. For the embodiment of the present disclosure, because the offline electronic currency payment apparatus is in an offline state, after one or more transactions are paid, the paid amount needs to be deducted from the offline balance, but the electronic currency exchanged from the People's Bank of China is not deleted. At this time, the offline balance is smaller than the denomination of the electronic currency exchanged from the People's Bank of China.

As an alternative implementation of the embodiment of the present disclosure, the available balance may include an offline balance and an in-transit balance, and the electronic currency includes an offline electronic currency and an in-transit electronic currency. When the offline electronic currency payment apparatus is used as a collection device, the in-transit balance is an amount paid by another payment apparatus to the offline electronic currency payment apparatus in the offline state. When the offline electronic currency payment apparatus is used as a payment device, if the offline balance is not enough to pay the transaction amount, the in-transit balance can be used for payment, and the corresponding amount is deducted from the in-transit balance. Of course, it is also possible to set the in-transit balance as unavailable, and the user can be prompted that the offline balance is insufficient at this time. The in-transit balance can be set as available or unavailable according to actual needs.

In the embodiment of the present disclosure, the first security control module of the offline electronic currency payment apparatus does not delete the electronic currency stored in the first file storage module of the offline electronic currency payment apparatus after transmitting the wallet information to the first peer device, because the offline electronic currency payment apparatus is in an offline state and cannot perform accounting at a back end. Therefore, the problem that the remaining amount of the electronic currency is unavailable due to deletion of the electronic currency is avoided by only changing the value of the available balance of the offline electronic currency payment apparatus, without deleting the electronic currency stored by the offline electronic currency payment apparatus.

The electronic currency referred to in the embodiments of the present disclosure, which may also be referred to as a digital currency, is a currency in a form of data issued by the People's Bank of China, and includes at least a currency denomination, an owner identification, and an issuer signature.

The offline electronic currency includes only one electronic currency, a denomination of the offline electronic currency is a denomination equivalent to an amount to be exchanged determined according to the exchange requirement; or the offline electronic currency may include one or more electronic currencies having a denomination the same as the denomination of the existing paper currency.

When the offline electronic currency only includes one electronic currency, e.g., one electronic currency, which corresponds to the amount required to be exchanged and is issued by the People's Bank of China based on the amount required to be exchanged by the user, for example, when XX needs to exchange the electronic currency of 153 yuan, the denomination of the electronic currency exchanged by the People's Bank of China for XX is 153 yuan. When the offline electronic currency is only one electronic currency with an indefinite denomination, the data storage amount is reduced, and the data amount transmitted during each transaction can be reduced. In addition, the problem of producing broken money can be avoided.

When the offline electronic currency includes one or more electronic currencies, the offline electronic currency may refer to an existing paper currency system consisting of one or more currencies of different fixed denominations including, for example, 1, 10, 20, 50 and 100 yuan, etc. For example, XX needs to exchange for 153, and the electronic currency exchanged for XX by the People's Bank of China may include one 100 yuan, one 50 yuan and three 1 yuan, or three 50 yuan and three 1 yuan, and the like, which depends specific actual needs. When the offline electronic currency is a plurality of currencies of different fixed denominations, it can be common with the existing monetary system.

The in-transit electronic currency is an electronic currency paid by another payment device to the offline electronic currency payment apparatus, and an electronic currency of the other payment device may be constructed in two ways with reference to the above-mentioned offline electronic currency, which will not be described in detail herein.

The owner identification is used for indicating an electronic currency exchanged by the People's Bank of China for a user corresponding to the owner identification, i.e., indicating a source of the electronic currency.

The issuer signature can be signature data obtained by signing the electronic currency via a private key of the People's Bank of China, for proving legitimacy of the electronic currency.

Of course, a data format of an electronic currency which can be used for implementation as an embodiment of the present disclosure is as follows in Table 1.

At S103, the first security control module receives collection information transmitted by the first peer device through the first communication module. The collection information is generated and transmitted after passing a verification of the first peer device. Passing the verification of the first peer device includes: verifying that offline account information is not included in an offline transaction blacklist stored in the first peer device, verifying that the electronic currency is legal, and verifying that the available balance is smaller than or equal to a total denomination of the electronic currency. The collection information at least includes first peer offline account information.

Specifically, the first peer device stores an offline transaction blacklist, which is a device list of offline transaction apparatuses defined as illegal users when the back end finds problems after online settlement thereof. The back end updates the offline transaction blacklist every time the first peer device gets online, and the first peer device stores the offline transaction blacklist after updating the offline transaction blacklist. The first peer device ensures that the offline electronic currency payment apparatus is a safe device by verifying that the offline electronic currency payment apparatus is not in the offline transaction blacklist.

The first peer device verifies that the electronic currency is legal, so that the offline electronic currency payment apparatus can be guaranteed to have a legal electronic currency, and security of subsequent transactions is guaranteed. As an alternative implementation of the embodiment of the present disclosure, the first peer device verifying that the electronic currency is legal includes: acquiring an issuer public key, and verifying the issuer signature of the electronic currency by using the issuer public key; and verifying the owner identification, and determining that the electronic currency is legal if the issuer signature and the owner identification pass the verification. The electronic currency is determined to be the legal money issued by the People's Bank of China by verifying the issuer signature, and the

TABLE 1

| Field | Data item | Definition |
|---|---|---|
| 1 | Version | The operator determines, during the exchange, a version number of the digital currency expression according to an interface of the People's Bank of China, and expression structures and password algorithms corresponding to different versions may be different. |
| 2 | Serial number | Ciphertext attribute domain generated by an encryption front-end system of the People's Bank of China, for security guarantee in operation at the operator end. |
| 3 | Transaction identification | Transaction summary of the DC core domain according to data transmitted from the operator, which is generated by the encryption front-end system of the People's Bank of China. |
| 4 | Amount | Denomination of a currency represented by the digital currency. |
| 5 | Operator identification | Unique identification for an operator specified in accordance with the united standard of the People's Bank of China. |
| 6 | Time stamp | Time stamp information generated by the operator in accordance with the united standard. |
| 7 | Reserved domain of the People's Bank of China | Meeting future expansion needs of the People's Bank of China. |
| 8 | Signature of the People's Bank of China | Signing by the People's Bank of China. |
| 9 | Owner identification | Owner unique identification generated by the operator in accordance with the standard. |
| 10 | Reserved domain of the operator | Meeting future expansion needs of the operator |
| 11 | Signature of the operator | Signing by the operator in accordance with the united standard. | electronic currency is determined to be the legal electronic currency exchanged for the legal user by verifying the owner identification.

If the first peer device verifies that the available balance is smaller than or equal to the total denomination of the electronic currency, it can be determined that the offline electronic currency payment apparatus operates normally and is not attacked illegally, ensuring that the offline electronic currency payment apparatus conducting transactions with the first peer device is a safe device.

The collection information will be transmitted to the offline electronic currency payment apparatus after passing all verifications of the first peer device. The collection information includes the first peer offline account information, so as to inform the offline electronic currency payment apparatus to pay the first peer device.

As an alternative implementation of an embodiment of the present disclosure, the first transaction amount may be carried in the collection information and transmitted to the offline electronic currency payment apparatus, so that the offline electronic currency payment apparatus knows the transaction amount.

At S104, the first security control module verifies whether the first peer offline account information is included in the offline transaction blacklist stored in the first file storage module. If the first peer offline account information is verified not to be included in the offline transaction blacklist stored in the first file storage module, first transaction information is acquired and digitally signed, and the first transaction data is transmitted to the first peer device through the communication module. The first transaction information at least includes the offline account information, the first peer offline account information, first transaction time and a first transaction amount, and the first transaction data at least includes the first transaction information and first signature information obtained by digitally signing the first transaction information.

Specifically, the first file storage module of the offline electronic currency payment apparatus stores an offline transaction blacklist, which is a device list of offline transaction apparatuses defined as illegal users when the back end finds problems after online settlement thereof. The back end updates the offline transaction blacklist every time the offline electronic currency payment apparatus gets online, and the offline electronic currency payment apparatus stores the offline transaction blacklist after updating the offline transaction blacklist. The offline electronic currency payment apparatus ensures that the first peer device is a safe device by verifying that the first peer device is not in the offline transaction blacklist.

After the offline electronic currency payment apparatus ensures the security of the first peer device, the first transaction data will be transmitted to the first peer device to complete the payment of the offline electronic currency payment apparatus. The offline electronic currency payment apparatus signs the first transaction information to ensure non-repudiation of the first transaction information. The offline account information and the first peer offline account information are used for identifying both sides of the transaction, the first transaction time is used for identifying time of the transaction, and the first transaction amount is an amount of this transaction. For each transaction, the transaction information includes the above contents for determining uniqueness of each transaction.

As an alternative implementation of the embodiment of the present disclosure, before the first security control module digitally signs the first transaction information, the offline electronic currency payment method provided by the embodiment of the present disclosure further includes: acquiring, by the first security control module, the first transaction amount. The acquiring of the first transaction amount includes: receiving, by the first security control module, the first transaction amount through a keyboard module; or controlling, by the first security control module, the first communication module to receive the first transaction amount carried in the collection information transmitted by the first peer device. Specifically, the transaction amount can be input on the offline electronic currency payment apparatus or can be input on the first peer device, and then the transaction amount is transmitted by the first peer device to the offline electronic currency payment apparatus for payment.

As an alternative implementation of the embodiment of the present disclosure, before the first security control module digitally signs the first transaction information, the offline electronic currency payment method provided by the embodiment of the present disclosure further includes: determining, by the first security control module, whether the first transaction amount is smaller than or equal to the available balance. Thus, the offline electronic currency payment apparatus can determine whether it has capability to pay for the transaction.

At S105, the first security control module controls the first file storage module to store a first transaction record including first transaction data, and controls the first file storage module to modify a stored current available balance into a balance obtained by deducting a first transaction amount from the available balance.

Specifically, the offline electronic currency payment apparatus stores the transaction record after the payment, so that subsequent settlement can be performed on-line. In addition, the offline electronic currency payment apparatus also modifies the current available balance to ensure subsequent payment capability.

As an alternative implementation of an embodiment of the present disclosure, the available balance includes an offline balance; the electronic currency includes an offline electronic currency; and the current available balance is a balance obtained by deducting the transaction amount from the offline balance.

As an alternative implementation of an embodiment of the present disclosure, the available balance includes an offline balance and an in-transit balance; the electronic currency includes an offline electronic currency and an in-transit electronic currency; and the current available balance is a balance obtained by deducting the first transaction amount from a sum of the offline balance and the in-transit balance.

As an alternative implementation of the embodiment of the present disclosure, the offline electronic currency payment method provided by the embodiment of the present disclosure further includes: performing an online connection, by the first security control module, with a back end through the communication module; transmitting the first transaction record and the current available balance to the back end; receiving an offline electronic currency issued by the back end based on the current available balance after the back end confirms that the transaction record and the current available balance are correct; controlling the first file storage module to store the offline electronic currency; and deleting all electronic currencies stored in the first file storage module. A denomination of the offline electronic currency is the current available balance.

Specifically, the offline electronic currency payment apparatus may perform online settlement. Online means that the offline electronic currency payment apparatus directly establishes a connection with the back end through a network, or establishes a connection with the back end through other equipment such as a computer, a handset or the like, which is not limited in the present disclosure. Under the condition of online settlement of the offline electronic currency payment apparatus, the back end is required to exchange a new electronic currency for the offline electronic currency payment apparatus, and the denomination of the new electronic currency is the current available balance of the offline electronic currency payment apparatus, so as to ensure that the denomination of the electronic currency of the offline electronic currency payment apparatus is the same as the current available balance after the online settlement.

Therefore, with the offline electronic currency payment method provided by the embodiment of the present disclosure, an offline payment mode for the electronic currency is achieved, and the offline payment of the electronic currency can be completed as long as the user uses his/her hardware wallet to execute the touch and pay operation. Therefore, the security of the offline payment of an electronic currency is ensured, while facilitating the operation of the user.

As an alternative implementation of the embodiment of the present disclosure, when the offline electronic currency payment apparatus has received one or more sums of money as a collection apparatus before payment, the offline electronic currency payment apparatus may make a payment using an in-transit balance. The available balance includes an offline balance and an in-transit balance. The electronic currency includes an offline electronic currency and an in-transit electronic currency. The wallet information further includes a second transaction record. The second transaction record includes second transaction data including: second transaction information, and second signature information obtained by signing the second transaction information by the second peer device. The second transaction information includes the offline account information, second peer offline account information, second transaction time and a second transaction amount. The passing the verification of the first peer device further includes: the first peer device verifying and passing the second signature information by using a public key of the second peer device. The current available balance is a balance obtained by deducting the first transaction amount from a sum of the offline balance and the in-transit balance.

Specifically, when the offline electronic currency payment apparatus transmits the wallet information to the first peer device, transaction records between the offline electronic currency payment apparatus and the second peer device are carried. Meanwhile, the offline electronic currency payment apparatus also transmits the electronic currency received from the second peer device and the in-transit balance to the first peer device, so that the first peer device verifies whether the transaction records between the offline electronic currency payment apparatus and the second peer device are correct, and verifies the payment capability of the offline electronic currency payment apparatus. The first peer device also verifies the second signature information in the second transaction record, thereby ensuring that the second transaction record is real and effective, i.e., the transaction record is indeed approved by the second peer device.

As an alternative implementation of the embodiment of the present disclosure, the first transaction information further includes a second transaction record. The offline electronic currency payment apparatus signs the first transaction information while treating the second transaction record as part of the first transaction information, thereby ensuring that the second transaction record is real and effective, i.e., the transaction record is indeed approved by the offline electronic currency payment apparatus.

As an alternative implementation of the embodiment of the present disclosure, after the first security control module performing the online connection with the back end through the communication module, the method further includes setting the in-transit balance to zero and the offline balance to the current available balance. This guarantees that the electronic currency of the offline electronic currency payment apparatus corresponds to the current available balance after the online settlement, thereby avoiding the existence of the unavailable balance.

This embodiment also provides a computer-readable storage medium including computer instructions that, when executed on a processor, perform the above offline electronic currency payment method according to the claims.

Embodiment 2

Figure 2:
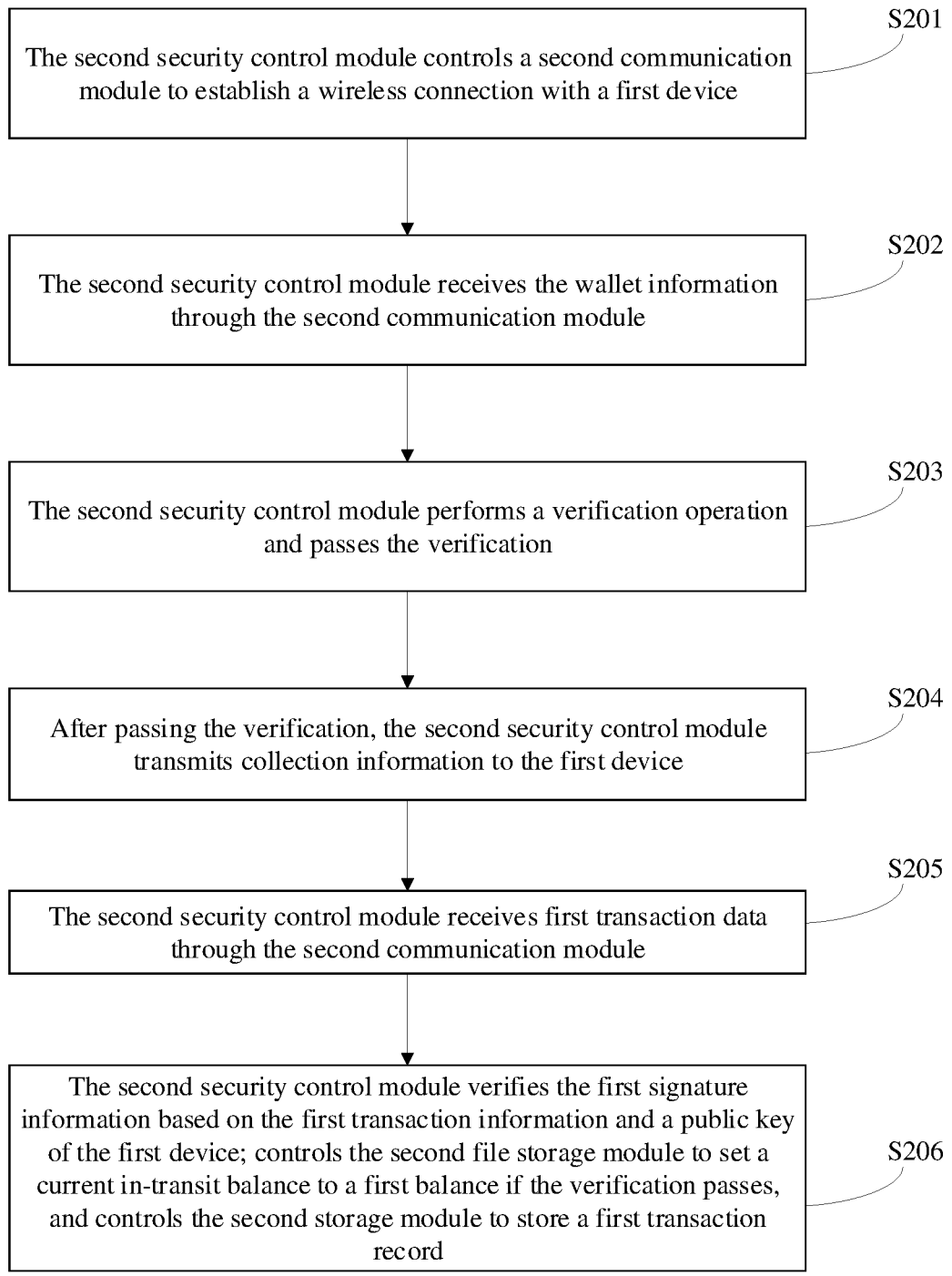
FIG. 2 is a flow chart of an offline electronic currency collection method provided in Embodiment 2 of the present disclosure.

FIG. 2 is a flow chart of an offline electronic currency collection method provided in Embodiment 2 of the present disclosure. Referring to FIG. 2, the offline electronic currency collection method provided by the embodiment of the present disclosure includes the following steps.

At S201, a second security control module controls a second communication module to establish a wireless connection with a first device.

In particular, in the embodiment of the present disclosure, the subject for executing the offline electronic currency collection method provided by the embodiment of the present disclosure is a payee device. Of course, the subject can also serve as a payer device.

In the embodiment of the present disclosure, the subject (hereinafter referred to as an offline electronic currency collection apparatus) for executing the offline electronic currency collection method provided by the embodiment of the present disclosure can be various collection terminals such as a hardware wallet, a smart phone, a POS machine and the like. Reference may be made to the description of the subject in Embodiment 1 for details.

The offline electronic currency collection apparatus provided by the embodiment of the present disclosure can establish a wireless connection with the first device for an electronic currency collection. The electronic currency collection through the wireless connection can facilitate the user, so that the user can perform a remote operation in the collection, thereby improving the user experience. Of course, in practical application, the offline electronic currency collection apparatus can also establish a wired connection with the first device, and the embodiment of the present disclosure is explained only by taking the example that the offline electronic currency collection apparatus establishes the wireless connection with the first device.

The wireless connection established between the offline electronic currency collection apparatus and the first device provided by the embodiment of the present disclosure can be NFC connection, Bluetooth connection, WIFI, infrared and the like, and is not particularly limited in the present disclosure. As an alternative implementation of the embodiment of the present disclosure, the second security control module controlling the second communication module to establish a wireless connection with the first device, includes: the second security control module controlling the second communication module to establish an NFC connection with the first device; the second security control module controlling the second communication module to transmit Bluetooth pairing information via the NFC connection; and the second security control module controlling the second communication module to establish a Bluetooth connection with the first device by using the Bluetooth pairing information. In the application, a user can make the offline electronic currency collection apparatus and the first device get in touch with each other, that is to allow the Bluetooth pairing information to be transmitted via the NFC connection, and then the offline electronic currency collection apparatus can be separated from the first device. This solves the problem that the user can only make a collection at a short distance by using the offline electronic currency collection apparatus and the first device, and thus improves the user experience. The Bluetooth pairing information is transmitted via the NFC connection, so that a device to be connected can be quickly found, thereby improving the speed of Bluetooth connection. This avoids Bluetooth broadcasting of respective information and searching of a peer end for pairing in the traditional Bluetooth connection, which would otherwise cause the slow speed, and further avoids the problem that a device to be connected is connected to other Bluetooth devices instead of the current device In order to ensure transaction security between the offline electronic currency collection apparatus and the first device, as an alternative implementation of the embodiment of the present disclosure, the offline electronic currency collection method provided by an embodiment of the present disclosure further includes, subsequent to the second security control module controlling the second communication module to establish the Bluetooth connection with the first device by using the Bluetooth pairing information, and prior to the second security control module receiving the wallet information through the second communication module: the second security control module performing mutual authentication with the first device through the Bluetooth connection. The authentication means may include, but is not limited to, verifying a certificate of a peer end, verifying an identification of the peer end, and the like. Such verification may employ the existing verification methods, which will not be described in detail herein.

At S202, the second security control module receives the wallet information through the second communication module. The wallet information includes first device offline account information, a first device available balance and a first device electronic currency. The first device electronic currency at least includes the following fields: a currency denomination, an owner identification, and an issuer signature.

Specifically, the offline collection by the offline electronic currency collection apparatus means that the offline electronic currency collection apparatus is used independently without being connected to the back end.

The wallet information refers to relevant information stored by the first device and can include, but is not limited to, the first device electronic currency, offline account information of a user of the first device, an available balance of the first device and the like. As a further option for practical applications, the wallet information can also include user information of the user of the first device, a digital certificate of the first device, a secret key, transaction information and the like.

As an alternative implementation of an embodiment of the present disclosure, the first device electronic currency may include an electronic currency exchanged by the user of the first device from the issuer (i.e., a first device offline electronic currency). Alternatively, the first device electronic currency may include an electronic currency exchanged by the user of the first device from the issuer (i.e., the first device offline electronic currency) and an electronic currency paid by others to the first device (i.e., a first device in-transit electronic currency).

As an alternative implementation of an embodiment of the present disclosure, the first device available balance includes a first device offline balance. The first device electronic currency includes a first device offline electronic currency. The first device offline balance is equal to a denomination of the electronic currency exchanged by the user of the first device from the issuer. For example, after the user of the first device exchanges the electronic currency from the People's Bank of China, the first device offline balance is set to the denomination of the electronic currency. The first device offline balance can also be smaller than the denomination of the electronic currency exchanged by the user of the first device from the issuer. For example, the user of the first device paid one or more transactions after exchanging the electronic currency from the People's Bank of China. For the embodiment of the present disclosure, because the first device is in an offline state, after one or more transactions are paid, the paid amount needs to be deducted from the first device offline balance, but the electronic currency exchanged from the People's Bank of China is not deleted. At this time, the offline balance is smaller than the denomination of the electronic currency exchanged from the People's Bank of China.

As an alternative implementation of an embodiment of the present disclosure, the first device available balance includes a first device offline balance and a first device in-transit balance, and the first device electronic currency includes a first device offline electronic currency and a first device in-transit electronic currency. When the first device is used as a collection device, the first device in-transit balance is an amount paid by another payment device to the first device in an offline state. When the first device is used as a payment device, if the first device offline balance is not enough to pay the transaction amount, the first device in-transit balance can be used for payment, and the corresponding amount is deducted from the first device in-transit balance. Of course, it is also possible to set the first device in-transit balance as unavailable, and the user may be prompted that the first device offline balance is insufficient at this time. The first device in-transit balance can be set as available or unavailable according to actual needs.

In the embodiment of the present disclosure, the first device does not delete the electronic currency stored in the first device after transmitting the wallet information to the offline electronic currency collection apparatus, because the first device is in an offline state and cannot perform accounting at a back end. Therefore, the problem that the remaining amount of the electronic currency is unavailable due to deletion of the electronic currency is avoided by only changing the value of the available balance of the first device, without deleting the electronic currency stored by the first device.

The first device electronic currency referred to in the embodiments of the present disclosure, which may also be referred to as digital currency, is currency in a form of data issued by the People's Bank of China, and includes at least a currency denomination, an owner identification, and an issuer signature.

The first device offline electronic currency may include only one electronic currency, a denomination of the first device offline electronic currency is a denomination equivalent to an amount to be exchanged determined according to the exchange requirement; or the first device offline electronic currency may include one or more electronic currencies having a denomination the same as the denomination of the existing paper currency.

When the first device offline electronic currency only includes one electronic currency, e.g., one electronic currency, which corresponds to the amount required to be exchanged and is issued by the People's Bank of China based on the amount required to be exchanged by the user, for example, when XX needs to exchange the electronic currency of 153 yuan, the denomination of the electronic currency exchanged by the People's Bank of China for XX is 153 yuan. When the device offline electronic currency is only one electronic currency with an indefinite denomination, the data storage amount is reduced, and the data amount transmitted during each transaction can be reduced. In addition, the problem of producing broken money can be avoided.

When the first device offline electronic currency includes one or more electronic currencies, the first device offline electronic currency may refer to an existing paper currency system consisting of one or more currencies of different fixed denominations including, for example, 1, 10, 20, 50 and 100 yuan, etc. For example, XX needs to exchange for 153, and the electronic currency exchanged for XX by the People's Bank of China may include one 100 yuan, one 50 yuan and three 1 yuan, or three 50 yuan and three 1 yuan, and the like, which depends specific actual needs. When the first device offline electronic currency is a plurality of currencies of different fixed denominations, it can be common with the existing monetary system The first device in-transit electronic currency is an electronic currency paid by another payment apparatus to the first device, and electronic currency of the other payment apparatus may be configured in two ways with reference to the first device offline electronic currency, which will not be described in detail herein.

The owner identification is used for indicating the electronic currency exchanged by the People's Bank of China for a user corresponding to the owner identification, i.e., indicating a source of the electronic currency.

The issuer signature can be signature data obtained by signing the electronic currency via a private key of the People's Bank of China, for proving the legitimacy of the electronic currency.

Reference may be made to Table 1 for a data format of an electronic currency which can be used for implementation as an embodiment of the present disclosure.

At S203, the second security control module performs a verification operation and passes the verification. The verification operation includes: verifying whether the first device offline account information is included in an offline transaction blacklist stored in a second file storage module, verifying whether the first device electronic currency is legal, and verifying whether the first device available balance is smaller than or equal to total denomination of the first device electronic currency; and the passing of the verification includes: verifying that the first device offline account information is not included in an offline transaction blacklist stored in the second file storage module, verifying that the first device electronic currency is legal, and verifying that the first device available balance is smaller than or equal to the total denomination of the first device electronic currency.

Specifically, the second file storage module of the offline electronic currency collection apparatus stores an offline transaction blacklist, which is a device list of offline transaction apparatuses defined as illegal users when the back end finds problems after online settlement thereof. The back end updates the offline transaction blacklist every time the offline electronic currency collection apparatus gets online, and the offline electronic currency collection apparatus stores the offline transaction blacklist by using the second file storage module after updating the offline transaction blacklist. The offline electronic currency collection apparatus ensures that the first device is a safe device by verifying that the first device is not in the offline transaction blacklist.

The offline electronic currency collection apparatus verifies that the electronic currency is legal, so that the first device can be guaranteed to have a legal electronic currency, and security of subsequent transactions is guaranteed. As an alternative implementation of the embodiment of the present disclosure, the second security control module verifying that the first device electronic currency is legal includes: the second security control module acquiring an issuer public key, verifying the issuer signature of the first device electronic currency by using the issuer public key, verifying the owner identification, and determining that the first device electronic currency is legal if the issuer signature and the owner identification pass the verification. The first device electronic currency is determined to be the legal money issued by the People's Bank of China by verifying the issuer signature, and the first device electronic currency is determined to be the legal first device electronic currency exchanged for the legal user by verifying the owner identification.

If the offline electronic currency collection apparatus verifies that the first device available balance is smaller than or equal to the total denomination of the first device electronic currency, it can be determined that the first device operates normally and is not illegally attacked, ensuring that the first device conducting transaction with the offline electronic currency collection apparatus is a safe device.

At S204, after passing the verification, the second security control module transmits collection information to the first device. The collection information at least includes self offline account information obtained from the second file storage module.

Specifically, the collection information will be transmitted to the first device after passing all verifications of the offline electronic currency collection apparatus. The collection information includes self offline account information, so as to inform the first device to pay the offline electronic currency collection apparatus.

As an alternative implementation of an embodiment of the present disclosure, the first transaction amount may be carried in the collection information and transmitted to the offline electronic currency payment apparatus, so that the first device knows the transaction amount.

As an alternative implementation of the present disclosure, the first transaction amount is received by the second security control module through the keypad module.

At S205, the second security control module receives first transaction data through the second communication module. The first transaction data is generated after the first device verifies that the self offline account information is not included in an offline transaction black list stored in the first device. The first transaction data at least includes first transaction information and first signature information obtained by digitally signing the first transaction information. The first transaction information at least includes the first device offline account information, the self offline account information, first transaction time and a first transaction amount.

Specifically, the first device also stores an offline transaction blacklist, which is a device list of first devices defined as illegal users when the back end finds problems after online settlement thereof. The back end updates the offline transaction blacklist every time the first device gets online, and the first device stores the offline transaction blacklist after updating the offline transaction blacklist. The first device ensures that the offline electronic currency payment apparatus is a safe device by verifying that the offline electronic currency payment apparatus is not in the offline transaction blacklist.

After the first device ensures the security of the offline electronic currency payment apparatus, the first transaction data will be transmitted to the offline electronic currency payment apparatus to complete the payment of the offline electronic currency payment apparatus. The first device signs the first transaction information to ensure non-repudiation of the first transaction information. The first device offline account information and the self offline account information are used for identifying both sides of the transaction, the first transaction time is used for identifying time of the transaction, and the first transaction amount is an amount of this transaction. For each transaction, the transaction information includes the above contents for determining uniqueness of each transaction.

As an alternative implementation of the embodiment of the present disclosure, if the first transaction amount is not included in the collection information, the first device needs to acquire the first transaction amount before digitally signing the first transaction information. The acquiring of the first transaction amount includes that the first device receives the first transaction amount through the keyboard module.

As an alternative of an embodiment of the present disclosure, the first device may further determine that the first transaction amount is smaller than or equal to the first device available balance before digitally signing the first transaction information. Thus, the first device may determine whether it has capability to pay for the transaction.

At S206, the second security control module verifies the first signature information based on the first transaction information and a public key of the first device; controls the second file storage module to set a current in-transit balance to a first balance if the verification passes, and controls the second storage module to store a first transaction record. The first transaction record includes the first transaction data, and the first balance is a balance obtained by adding the first transaction amount to an original in-transit balance.

Specifically, after the second security control module of the offline electronic currency collection apparatus receives the first transaction data transmitted by the first device, the transaction is recorded, and the first transaction amount corresponding to the transaction is accumulated to the in-transit balance in the second file storage module of the offline electronic currency collection apparatus. The offline electronic currency collection apparatus also verifies the first signature information to ensure that the first transaction information is real and effective and the transaction is indeed approved by the first device.

As an alternative implementation of an embodiment of the present disclosure, the in-transit balance of the offline electronic currency collection apparatus may or may not be used for subsequent offline payments, which may be set based on actual needs. In the case where the in-transit balance of the offline electronic currency collection apparatus can be used for subsequent offline payments, the offline electronic currency collection apparatus also needs to store the first device electronic currency to certify the payment capability of the offline electronic currency collection apparatus.

As an alternative implementation of the embodiment of the present disclosure, the offline electronic currency collection method provided by the embodiment of the present disclosure further includes: performing an online connection, by the second security control module, with a back end through the second communication module, transmitting the first transaction record, the first balance and an original self offline balance to the back end, receiving a new self electronic currency issued by the back end after confirming that the first transaction record, the first balance and the original self offline balance are correct, and controlling the second file storage module to store the new self electronic currency, deleting all the electronic currency stored in the second file storage module, and setting the current in-transit balance to 0 and a current offline balance to a denomination of the new self electronic currency. The denomination of the new self electronic currency is equal to a sum of the first balance and the original self offline balance.

Specifically, the offline electronic currency collection apparatus may perform online settlement. Performing the online connection means that the offline electronic currency collection apparatus establishes a connection with the back end directly via a network, or via other equipment such as a computer, a handset or the like, which is not limited in the present disclosure. In the case of online settlement of the offline electronic currency collection apparatus, the back end is required to exchange a new electronic currency for the offline electronic currency collection apparatus, a denomination of the new electronic currency is a sum of the self offline balance of the offline electronic currency collection apparatus and the current in-transit balance. The current in-transit balance of the offline electronic currency collection apparatus is set to 0, and the current self offline balance is set to the denomination of the new self electronic currency. This can ensure that after the online settlement, the electronic currency of the offline electronic currency payment apparatus corresponds to its available balance so as to avoid the problem that the unavailable balance exists.

Therefore, with the offline electronic currency collection method provided by the embodiment of the present disclosure, an offline collection mode for the electronic currency is achieved, and the offline collection of the electronic currency can be completed as long as the user uses his/her hardware wallet to execute the touch and pay operation. Therefore, the security of the offline collection of electronic currency is ensured, while facilitating the operation of the user.

As an alternative implementation of an embodiment of the present disclosure, the first device available balance includes a first device offline balance and a first device in-transit balance; the first device electronic currency includes a first device offline electronic currency and a first device in-transit electronic currency; and the wallet information further includes a second transaction record. The second transaction record includes second transaction data, which at least includes: second transaction information and second signature information obtained by signing the second transaction information by the second device. The second transaction information includes second device offline account information, first device offline account information, second transaction time and a second transaction amount. Performing the verification operation by the second security control module further includes: verifying, by the second security control module, the second signature information by using a public key of the second device; and passing of the verification by the second security control module further includes the second security control module verifying and passing the second signature information by using the public key of the second device.

Specifically, when the first device transmits the wallet information to the offline electronic currency collection apparatus, transaction records between the first device and the second device are carried. Meanwhile, the first device also transmits the electronic currency received from the second device and the in-transit balance of the first device to the offline electronic currency collection apparatus, so that the offline electronic currency collection apparatus verifies whether the transaction records between the first device and the second device are correct, and verifies the payment capability of the first device. The offline electronic currency collection apparatus also verifies the second signature information in the second transaction record, thereby ensuring that the second transaction record is real and effective, i.e., the transaction record is indeed approved by the second device.

As an alternative implementation of the embodiment of the present disclosure, the first transaction information further includes a second transaction record. The first device signs the first transaction information while treating the second transaction record as part of the first transaction information, thereby ensuring that the second transaction record is real and effective, i.e., the transaction record is indeed approved by the first device.

This embodiment also provides a computer-readable storage medium including computer instructions that, when executed on a processor, perform the above offline electronic currency collection method.

Any process or method description in a flow chart or otherwise described herein may be understood to represent modules, segments, or portions of code including one or more executable instructions for implementing the steps of a particular logical function or process. In addition, the scope of preferred embodiments of the present disclosure includes additional implementations which may not be in the order shown or discussed, including performing functions in a substantially simultaneous manner or in a reverse order in accordance with the functions involved, which should be understood by those skilled in the art to which the embodiments of the present disclosure pertain.

It will be appreciated by those skilled in the art that all or a portion of the steps carried by a method for implementing the embodiments described above may be performed by a program instructing the related hardware. The program may be stored in a computer-readable storage medium, and includes, when executed, one or a combination of the steps of the embodiments of the method.

Furthermore, the functional units in the various embodiments of the present disclosure may be integrated in one processing module or may be physically separate from each other, and it is also possible for two or more units to be integrated in one module. The integrated module can be implemented in the form of hardware or software functional modules. The integrated module, if implemented in the form of a software functional module and sold or used as a stand-alone product, may also be stored in a computer-readable storage medium. The above-mentioned storage medium may be a read-only memory, a magnetic disk, an optical disk, or the like.

What is claimed is:

1. An offline electronic currency payment method, comprising:

controlling, by a first security control module, a first communication module to establish a wireless connection with a first peer device;

acquiring, by the first security control module, wallet information from a first file storage module, and controlling, by the first security control module, the first communication module to transmit the wallet information to the first peer device, wherein the wallet information comprises offline account information, an available balance and an electronic currency; the electronic currency comprises at least the following fields: a currency denomination, an owner identification, and an issuer signature; and the first security control module does not delete the electronic currency stored in the first file storage module after transmitting the wallet information to the first peer device;

receiving, by the first security control module through the first communication module, collection information transmitted by the first peer device, wherein the collection information is generated and transmitted after passing a verification of the first peer device; passing the verification of the first peer device comprises: the first peer device verifying that the offline account information is not included in an offline transaction blacklist stored in the first peer device, verifying that the electronic currency is legal, and verifying that the available balance is smaller than or equal to a total denomination of the electronic currency, wherein the collection information at least comprises first peer offline account information;

verifying, by the first security control module, whether the first peer offline account information is included in an offline transaction blacklist stored in the first file storage module; in response to verifying that the first peer offline account information is not included in the offline transaction blacklist stored in the first file storage module, acquiring, by the first security control module, first transaction information; digitally signing, by the first security control module, the first transaction information; and transmitting, by the first security control module, first transaction data to the first peer device through the first communication module, wherein the first transaction information at least comprises the offline account information, the first peer offline account information, first transaction time and a first transaction amount, and the first transaction data at least comprises the first transaction information and first signature information obtained by digitally signing the first transaction information; and controlling, by the first security control module, the first file storage module to store a first transaction record comprising the first transaction data, and controlling, by the first security control module, the first file storage module to modify a stored current available balance into a balance obtained by deducting the first transaction amount from the available balance, wherein controlling, by the first security control module, the first communication module to establish the wireless connection with the first peer device comprises:

controlling, by the first security control module, the communication module to establish a Near Field Communication (NFC) connection with the first peer device;

controlling, by the first security control module, the communication module to transmit Bluetooth pairing information via the NFC connection; and controlling, by the first security control module, the communication module to establish a Bluetooth connection with the first peer device by using the Bluetooth pairing information.

2. The method according to claim 1, further comprising:
performing an online connection, by the first security control module, with a back end through the first communication module;
transmitting, by the first security control module, the first transaction record and the current available balance to the back end;
receiving, by the first security control module, an offline electronic currency issued by the back end based on the current available balance after the back end confirms that the transaction record and the current available balance are correct;
controlling, by the first security control module, the first file storage module to store the offline electronic currency; and
deleting, by the first security control module, all electronic currencies stored in the first file storage module, wherein a denomination of the offline electronic currency is the current available balance.

3. The method according to claim 1, further comprising, prior to said digitally signing, by the first security control module, the first transaction information:
acquiring, by the first security control module, the first transaction amount,
wherein said acquiring the first transaction amount comprises:
receiving, by the first security control module, the first transaction amount through a keyboard module; or
controlling, by the first security control module, the first communication module to receive the first transaction amount carried in the collection information transmitted by the first peer device.

4. The method according to claim 3, wherein,
the available balance comprises an offline balance;
the electronic currency comprises an offline electronic currency; and
the current available balance is a balance obtained by deducting the transaction amount from the offline balance.

5. The method according to claim 3, wherein,
the available balance comprises an offline balance and an in-transit balance;
the electronic currency comprises an offline electronic currency and an in-transit electronic currency;
the wallet information further comprises a second transaction record; wherein the second transaction record comprises second transaction data comprising: second transaction information and second signature information obtained by signing the second transaction information by a second peer device; and the second transaction information comprises the offline account information, second peer offline account information, second transaction time and a second transaction amount;
said passing the verification of the first peer device further comprises: the first peer device verifying and passing the second signature information by using a public key of the second peer device; and
the current available balance is a balance obtained by deducting the first transaction amount from a sum of the offline balance and the in-transit balance.

6. The method according to claim 5, wherein the first transaction information further comprises the second transaction record.

7. The method according to claim 5, further comprising, after performing the online connection, by the first security control module, with the back end through the first communication module:
setting the in-transit balance to zero and the offline balance to the current available balance.

8. An offline electronic currency collection method, comprising:
controlling, by a second security control module, a second communication module to establish a wireless connection with a first device;
receiving, by the second security control module, wallet information through the second communication module, wherein the wallet information comprises first device offline account information, a first device available balance and a first device electronic currency, wherein the first device electronic currency at least comprises the following fields: a currency denomination, an owner identification, and an issuer signature;
performing a verification operation and passing of the verification by the second security control module, wherein the verification operation comprises: verifying whether the first device offline account information is included in an offline transaction blacklist stored in a second file storage module, verifying whether the first device electronic currency is legal, and verifying whether the first device available balance is smaller than or equal to a total denomination of the first device electronic currency; and the passing of the verification comprises: verifying that the first device offline account information is not included in the offline transaction blacklist stored in the second file storage module, verifying that the first device electronic currency is legal, and verifying that the first device available balance is smaller than or equal to the total denomination of the first device electronic currency;
transmitting, by the second security control module after the passing of the verification, collection information to the first device, wherein the collection information at least comprises self offline account information acquired from the second file storage module;
receiving, by the second security control module, first transaction data through the second communication module, wherein the first transaction data is generated after the first device verifies that the self offline account information is not included in an offline transaction blacklist stored in the first device; the first transaction data at least comprises first transaction information and first signature information obtained by digitally signing the first transaction information; and the first transaction information at least comprises the first device offline account information, the self offline account information, first transaction time and a first transaction amount; and
verifying, by the second security control module, the first signature information in accordance with the first transaction information and a public key of the first device; controlling, by the second security control module in response to passing of the verifying, the second file storage module to set a current in-transit balance to a first balance, and controlling the storage module to store a first transaction record comprising the first transaction data, wherein the first balance is a balance obtained by adding the first transaction amount to an original in-transit balance, wherein controlling, by the second security control module, the second communication module to establish a wireless connection with the first device comprises:
controlling, by the second security control module, the second communication module to establish an NFC connection with the first device;
controlling, by the second security control module, the second communication module to transmit Bluetooth pairing information via the NFC connection;
and controlling, by the second security control module, the second communication module to establish a Bluetooth connection with the first device by using the Bluetooth pairing information.

9. The method according to claim 8, further comprising:
performing an online connection, by the second security control module, with a back end through the second communication module, transmitting the first transaction record, the first balance and an original self offline balance to the back end, receiving a new self electronic currency issued by the back end after the back end confirms that the first transaction record, the first balance and the original self offline balance are correct, and controlling the second file storage module to store the new self electronic currency; deleting all electronic currencies stored in the second file storage module, and setting the current in-transit balance to zero and a current self offline balance to a denomination of the new self electronic currency, wherein the denomination of the new self electronic currency is equal to a sum of the first balance and the original self offline balance.

10. The method according to claim 8, wherein,
the first device available balance comprises a first device offline balance; and
the first device electronic currency comprises a first device offline electronic currency.

11. The method according to claim 8, wherein,
the first device available balance comprises the first device offline balance and the first device in-transit balance;

the first device electronic currency comprises a first device offline electronic currency and a first device in-transit electronic currency;

the wallet information further comprises a second transaction record; wherein the second transaction record comprises second transaction data at least comprising: second transaction information and second signature information obtained by signing the second transaction information by a second device; and the second transaction information comprises second device offline account information, the first device offline account information, second transaction time and a second transaction amount;

said performing the verification operation by the second security control module further comprises: verifying, by the second security control module, the second signature information by using a public key of the second device; and the passing of the verification by the second security control module further comprises the second security control module verifying and passing the second signature information by using the public key of the second device.

12. The method according to claim 11, wherein the first transaction information further comprises the second transaction record.

13. The method according to claim 8, wherein the collection information further comprises the first transaction amount received by the second security control module through a keyboard module.

14. A non-transitory computer-readable storage medium, comprising computer instructions that, when executed on a processor, perform the offline electronic currency payment method of claim 1.

15. A non-transitory computer-readable storage medium, comprising computer instructions that, when executed on a processor, perform the offline electronic currency collection method of claim 8.

* * * * *